US010372401B2

(12) United States Patent
Ryu et al.

(10) Patent No.: US 10,372,401 B2
(45) Date of Patent: Aug. 6, 2019

(54) DISPLAY MODULE AND DISPLAY DEVICE HAVING THE SAME

(71) Applicant: SAMSUNG ELECTRONICS CO., LTD., Suwon-si (KR)

(72) Inventors: Chang Won Ryu, Suwon-si (KR); Nguyen huu lam Vuong, Suwon (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 372 days.

(21) Appl. No.: 15/007,734

(22) Filed: Jan. 27, 2016

(65) Prior Publication Data
US 2016/0231976 A1 Aug. 11, 2016

(30) Foreign Application Priority Data

Feb. 9, 2015 (KR) .................. 10-2015-0019472

(51) Int. Cl.
G06F 3/14 (2006.01)
G06F 1/16 (2006.01)
G09G 3/30 (2006.01)
H05K 5/00 (2006.01)
G09F 9/302 (2006.01)

(52) U.S. Cl.
CPC .......... *G06F 3/1446* (2013.01); *G06F 1/1601* (2013.01); *G09F 9/3026* (2013.01); *G09G 3/30* (2013.01); *H05K 5/0017* (2013.01); *G09G 2300/026* (2013.01); *G09G 2330/02* (2013.01)

(58) Field of Classification Search
CPC .............. F21Y 2115/10; F21Y 2105/16; G06F 1/1616; G06F 1/165; G06F 3/0488; G06F 3/1446; G09G 2330/02; G09G 2330/027
See application file for complete search history.

(56) References Cited

U.S. PATENT DOCUMENTS

2008/0122376 A1*  5/2008  Lys ...................... H05B 33/083
                                                              315/192
2009/0122528 A1*  5/2009  Tsai ......................... F21K 9/00
                                                              362/147
2009/0309494 A1   12/2009  Patterson et al.
2010/0090934 A1    4/2010  Elliott et al.
(Continued)

FOREIGN PATENT DOCUMENTS

CN    102121559 A    7/2011
CN    203880365 U    10/2014
(Continued)

OTHER PUBLICATIONS

Communication dated Jul. 4, 2016, issued by the European Patent Office in counterpart European Application No. 16154125.5.
(Continued)

*Primary Examiner* — Gerald Johnson
(74) *Attorney, Agent, or Firm* — Sughrue Mion, PLLC

(57) ABSTRACT

Provided is a display module including: a cabinet; and a plurality of Light Emitting Diode (LED) panels arranged on the cabinet in an array, each LED panel of the plurality of LED panels having a plurality of LEDs, wherein the cabinet includes a plurality of level regulators configured to regulate level differences amongst the plurality of LED panels, and wherein the plurality of level regulators include first level regulators provided at respective corners of the plurality of LED panels.

23 Claims, 15 Drawing Sheets

(56) References Cited

U.S. PATENT DOCUMENTS

| | | | |
|---|---|---|---|
| 2011/0163052 A1 | 7/2011 | Kim et al. | |
| 2012/0113552 A1* | 5/2012 | Ito | H01L 23/50 361/18 |
| 2012/0251072 A1* | 10/2012 | Cope | G09F 9/33 386/230 |
| 2012/0260483 A1 | 10/2012 | Patterson et al. | |
| 2014/0003052 A1* | 1/2014 | Hemiller | F21V 21/34 362/249.02 |
| 2015/0187238 A1* | 7/2015 | Hall | G06F 3/1446 40/544 |

FOREIGN PATENT DOCUMENTS

| | | | |
|---|---|---|---|
| EP | 0914011 A1 | 5/1999 |
| EP | 2741186 A1 | 6/2014 |
| WO | 2013160185 A1 | 10/2013 |

OTHER PUBLICATIONS

Communication dated Oct. 23, 2018, issued by the European Patent Office in counterpart European Application No. 16154125.5.
Communication dated Mar. 5, 2019, from the State Intellectual Property Office of People's Republic of China in counterpart Application No. 201610074568.7.

\* cited by examiner

DISPLAY MODULE AND DISPLAY DEVICE HAVING THE SAME

CROSS-REFERENCE TO RELATED APPLICATION

This application claims priority from Korean Patent Application No. 10-2015-0019472, filed on Feb. 9, 2015 in the Korean Intellectual Property Office, the disclosure of which is incorporated herein by reference in its entirety.

BACKGROUND

1. Field

Apparatuses consistent with exemplary embodiments relate to a display module and display device having the same.

2. Description of the Related Art

Light Emitting Diode (LED) display devices may form large-sized screens using a plurality of small-sized LED panels.

For example, for the huge outdoor displays, LED display devices with large pitches between LEDs arrayed on the LED panel have thus far been mainly used.

However, as demands for high-quality large display devices increase, various researches on a display device with small pitches between LEDs arrayed on the LED panel are taking place.

Furthermore, growing demands for super-sized display devices or large-sized indoor display devices are prompting various studies on portability and ways to provide simple installation of display devices.

SUMMARY

One or more examplary embodiments provide a display module capable of regulating level differences between a plurality of Light Emitting Diode (LED) panels included in the display module.

One or more examplary embodiments also provide a display module which is easy to carry and install.

One or more examplary embodiments also provide a display device having a plurality of display modules, which may facilitate combination of the display modules and regulate level differences between the display modules.

In accordance with an aspect of an exemplary embodiment, there is provided a display module including a cabinet; and a plurality of Light Emitting Diode (LED) panels arrayed on the cabinet, each LED panel having a plurality of LEDs to form an image, wherein the cabinet comprises a plurality of level regulators configured to regulate level differences between the plurality of LED panels arrayed on the cabinet, and wherein the plurality of level regulators comprise first level regulators provided corresponding to respective corners of the plurality of LED panels arrayed on the cabinet.

The plurality of level regulators may further include second level regulators arranged between the first level regulators.

The cabinet may further include a plurality of fastening parts to fasten the plurality of LED panels to the cabinet, wherein the plurality of fastening parts include first fastening parts formed to fasten the respective corners of the plurality of LED panels arrayed on the cabinet, and wherein the first level regulators are provided corresponding to the respective first fastening parts and located adjacent to the respective first fastening parts.

The plurality of fastening parts may further include second fastening parts arranged between the first fastening parts, and the second level regulators may be provided corresponding to the respective second fastening parts and located adjacent to the respective second fastening parts.

The plurality of LED panels may each include a plurality of combining parts to be combined with the cabinet, and the plurality of level regulators may be arranged to press the LED panels between the combining parts and the edges of the LED panels.

The plurality of LED panels may each include an LED substrate on which a plurality of LEDs are arranged, and a supporting member to support the LED substrate, the LED substrate may include a plurality of combining parts to be combined with the supporting member, the supporting member may include a plurality of fastening parts to fasten the LED substrate to the supporting member, and a plurality of combining parts to be combined with the cabinet, and the level regulators may be arranged to press the LED panels between the combining parts and fastening parts of the supporting member.

The plurality of level regulators may be configured to regulate level differences that are formed in a direction substantially perpendicular to a direction in which the plurality of LED panels are arrayed.

The cabinet may include a base plate on which the LED panels are mounted, and the level regulators may include level regulation holes formed on the base plate, and level regulation bolts inserted into the level regulation holes, wherein the level regulation bolts are moving by rotation through the level regulation hole to press the LED panels.

The level regulation bolts may be non-head bolts.

The plurality of LED panels may each include a guide member to guide a direction in which the LED panel is to be mounted on the cabinet.

The cabinet may include guide grooves into which the guide members are inserted.

The cabinet may have a signal control board to control the plurality of LED panels and a power supply device to supply power to the plurality of LED panels.

The cabinet may include a handle to easily carry the display module.

The cabinet may include at least one connection unit formed for combination with another display module.

In accordance with an aspect of another exemplary embodiment, there is provided a display module including a cabinet having a base plate; a plurality of Light Emitting Diode (LED) panels arrayed on the base plate in first and second directions; a plurality of first level regulators arranged on the base plate for regulating level differences formed on the borders between three neighboring LED panels in the first and second directions; and a plurality of second level regulators arranged on the base plate for regulating level differences formed on the borders between two neighboring LED panels in the first or second direction.

In accordance with an aspect of another exemplary embodiment, there is provided a display device including a plurality of display modules, wherein the plurality of display module each includes a plurality of Light Emitting Diode (LED) panels each having a plurality of LEDs arranged to form an image; and a cabinet having the plurality of LED panels mounted thereon, and level regulators configured to regulate level differences between the plurality of LED panels, and wherein the plurality of display modules comprise a first display module, and at least one second display module arranged in a first direction with respect to the first display module, and the first and second display modules are connected in the first direction by first connection units formed respectively on the cabinets of the first and second display modules.

The plurality of display modules may further include at least one third display module arranged in a second direction with respect to the first display module, and the first and third display modules are connected in the second direction by second connection units formed respectively on the cabinets of the first and third display modules.

The first connection units may include at least one first link arranged on one side of the first and second display modules, and at least one second link arranged on the other side of the first and second display modules, and the first link of the first display module may be combined with the second link of the second display module.

The second connection units may include at least one third link arranged on one side of the first and third display modules, and at least one fourth link arranged on the other side of the first and third display modules, and the third link of the first display module may be combined with the fourth link of the third display module.

The first and third links may have fastening members formed thereon, the second and fourth links may have insertion holes formed thereon into which the fastening members are inserted, and the plurality of display modules may be combined with one another by inserting the fastening members into the insertion holes.

The plurality of display modules may each include a signal control board to control the plurality of LED panels, and the display device may further include a main board to transmit image signals to the signal control board.

In accordance with an aspect of another exemplary embodiment, there is provided a method for manufacturing a display module including: preparing a plurality of Light Emitting Diode (LED) panels to form an image; putting the plurality of LED panels on a cabinet; regulating level differences between corners of the plurality of LED panels by means of first level regulating members arranged on the cabinet; and regulating level differences between edges of the plurality of LED panels by means of second level regulating members arranged on the cabinet.

In accordance with an aspect of another exemplary embodiment, there is provided a method for manufacturing a display device including preparing a plurality of display modules, each having a cabinet and a plurality of Light Emitting Diode (LED) panels mounted on the cabinet to form an image, wherein the plurality of LED panels are regulated to eliminate level differences between the LED panels by a plurality of level regulating members formed on the cabinet; connecting the plurality of display modules in a first or second direction via at least one connection unit formed on the cabinet; and regulating level differences between the plurality of display modules with a plurality of level regulating members formed on the cabinet.

In accordance with an aspect of another exemplary embodiment, there is provided a display module including: a cabinet; and a plurality of Light Emitting Diode (LED) panels arranged on the cabinet in an array, each LED panel of the plurality of LED panels having a plurality of LEDs, wherein the cabinet includes a plurality of level regulators configured to regulate level differences amongst the plurality of LED panels, and wherein the plurality of level regulators include first level regulators provided at respective corners of the plurality of LED panels.

The plurality of level regulators may further include second level regulators arranged between the first level regulators.

The second level regulators may be arranged along respective edges of the plurality of LED panels.

The cabinet may include a first plurality of fastening parts to fasten the plurality of LED panels to the cabinet, wherein the first plurality of fastening parts may include first fastening parts configured to fasten the respective corners of the plurality of LED panels to the cabinet, and wherein the first level regulators are provided at respective corners of the plurality of LED panels and adjacent to the respective first fastening parts.

The first plurality of fastening parts may further include second fastening parts arranged between the first fastening parts, and wherein the second level regulators may be provided adjacent to the respective second fastening parts.

The second fastening parts may be arranged along respective edges of the plurality of LED panels.

Each of the plurality of LED panels may include a first plurality of combining parts configured to attach the plurality of LED panels to the cabinet, and the plurality of level regulators may be configured to press the LED panels at locations between the first plurality of combining parts and edges of the LED panels.

Each of the plurality of LED panels may include: an LED substrate on which a plurality of LEDs are provided; and a supporting member supporting the LED substrate, wherein the LED substrate may include a second plurality of combining parts configured to fasten the LED substrate to the supporting member, wherein the supporting member may include: a second plurality of fastening parts to fasten the LED substrate to the supporting member; and a third plurality of combining parts configured to fasten the supporting member to the cabinet, and wherein the plurality of level regulators may be configured to press the LED panels at locations between the third plurality of combining parts and the second plurality of fastening parts of the supporting member.

The plurality of level regulators may be configured to regulate level differences that are formed in a thickness direction of the display module.

The cabinet may include a base plate on which the LED panels are mounted, wherein the plurality of level regulators may include: level regulation holes provided in the base plate; and level regulation bolts inserted into the level regulation holes, and wherein the level regulation bolts may be configured to move via rotation through the level regulation hole to press the LED panels.

Each of the plurality of LED panels may include a guide member configured to guide a mounting direction of the LED panel onto the cabinet.

The cabinet may include guide grooves into which the guide members are inserted.

The cabinet may include: a signal control board configured to control the plurality of LED panels; and a power supply device configured to supply power to the plurality of LED panels.

The cabinet may include at least one connection unit configured to connect another display module to the display module.

In accordance with an aspect of another exemplary embodiment, there is provided a display module including: a cabinet having a base plate; a plurality of Light Emitting Diode (LED) panels provided on the base plate in first and second directions; and a plurality of level regulators provided on the base plate and configured to regulate level differences formed on the borders amongst the plurality of LED panels, wherein the plurality of LED panels comprise a first LED panel, a second LED panel arranged in the first direction adjacent to the first LED panel, and a third LED panel arranged in the second direction adjacent to the first LED panel, and wherein the plurality of level regulators comprise a plurality of first level regulators and a plurality of second level regulators, the plurality of first level regulators are configured to regulate level difference formed on the border amongst the first, the second and the third LED panels, and the plurality of second level regulators are configured to regulate level differences formed on the borders between the first and the second LED panels or between the first and the third LED panels.

In accordance with an aspect of another exemplary embodiment, there is provided a display device including a plurality of display modules, wherein each of the plurality of display module includes: a plurality of Light Emitting Diode (LED) panels, each of the plurality of LED panels including a plurality of LEDs; a cabinet on which the plurality of LED panels are mounted; and level regulators configured to regulate level differences amongst the plurality of LED panels, and wherein the plurality of display modules may include: a first display module; and at least one second display module arranged in a first direction with respect to the first display module, and wherein each of the first and the second display modules includes a first connection unit and the first and second display modules are connected in the first direction by the first connection units of the first and the second display modules.

The plurality of display modules may further include at least one third display module arranged in a second direction with respect to the first display module, and wherein each of the first and the third display modules may include a second connection unit and the first and the third display modules are connected in the second direction by the second connection units of the first and third display modules.

The first connection unit may include: at least one first link arranged on a first side of each of the first and the second display modules, and at least one second link arranged on a second side opposite to the first side of each of the first and the second display modules, and wherein the at least one first link of the first display module is combined with the at least one second link of the second display module.

The second connection unit may include: at least one third link arranged on a first side of each of the first and the third display modules; and at least one fourth link arranged on a second side opposite to the first side of each of the first and third display modules, and wherein the at least one third link of the first display module is combined with the at least one fourth link of the third display module.

Each of the first and the third links may include a link fastening member, wherein each of the second and fourth links includes an insertion hole into which the fastening member is inserted, and wherein the plurality of display modules are fastened with one another by the insertion of the fastening members into the insertion holes.

Each of the plurality of display modules may include a signal control board configured to control the plurality of LED panels, and a main board configured to transmit image signals to the signal control board.

In accordance with an aspect of another exemplary embodiment, there is provided a method for manufacturing a display module, the method including: preparing a plurality of Light Emitting Diode (LED) panels to display an image; mounting the plurality of LED panels on a cabinet; regulating level differences between adjacent corners of the plurality of LED panels by first level regulating members arranged on the cabinet; and regulating level differences between edges of the plurality of LED panels by second level regulating members arranged on the cabinet.

In accordance with an aspect of another exemplary embodiment, there is provided a method for manufacturing a display device, the method including: preparing a plurality of display modules, each of the plurality of display modules including: a cabinet; and a plurality of Light Emitting Diode (LED) panels mounted on the cabinet to display an image, wherein the plurality of LED panels are regulated to eliminate level differences amongst the plurality of LED panels by a plurality of level regulating members provided on the cabinet; connecting the plurality of display modules in a first or second direction via at least one connection unit; and regulating level differences between the plurality of display modules with the plurality of level regulating members provided on the cabinet.

In accordance with an aspect of another exemplary embodiment, there is provided a display module including: a cabinet including a base plate; a plurality of Light Emitting Diode (LED) panels including: a first LED panel; and a second LED panel, the first and the second LED panels mounted on the base plate and arranged adjacent to each other, wherein the base plate may include: a plurality of level holes including a first level hole and a second level hole; and a plurality of level regulators including a first level regulator and a second level regulator, the first regulator inserted in the first level hole and the second regulator inserted into the second level hole, wherein the first regulator is configured to press against a first corner of the first LED panel and the second regulator is configured to press against a first corner of the second LED panel, and wherein the first and the second regulators are configured to regulate level differences between the first and the second LED panels.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and/or other aspects of the present disclosure will become more apparent by describing in detail exemplary embodiments thereof with reference to the attached drawings in which.

Throughout the drawings, like reference numerals will be understood to refer to like parts, components, and structures.

DETAILED DESCRIPTION

Exemplary embodiments of a display module and display device including the display module will now be described in detail with reference to accompanying drawings. As used herein, the singular forms "a", "an" and "the" are intended to include the plural forms as well, unless the context clearly indicates otherwise. For the sake of clarity, the elements of the drawings are drawn with exaggerated forms and sizes.

Figure 1:
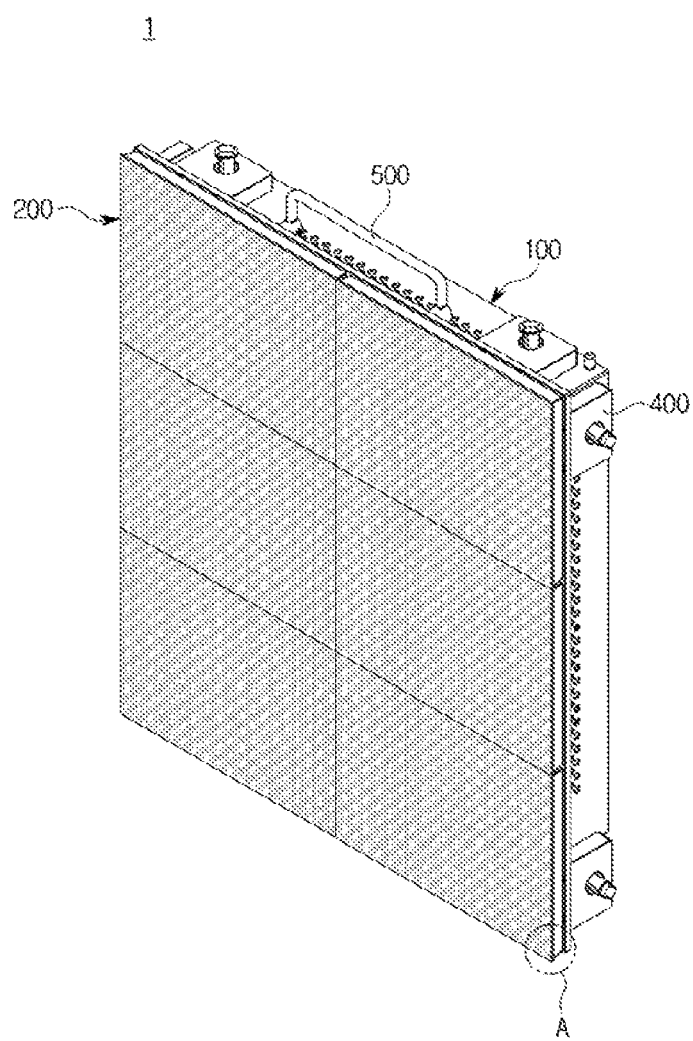
FIG. 1 is a view of the appearance of a display module, according to an exemplary embodiment, which is viewed from one side.
Figure 2:
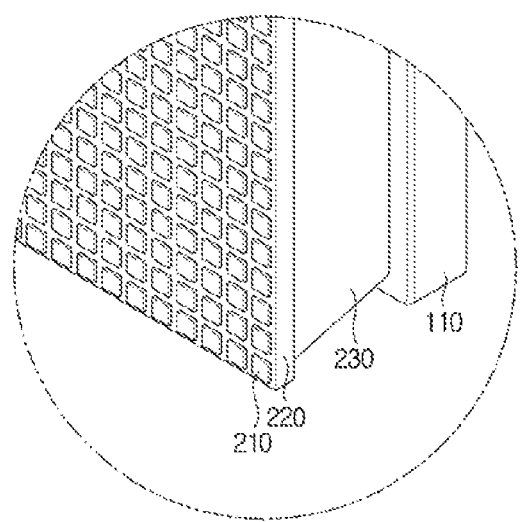
FIG. 2 is an enlarged view of part A of a Light Emitting Diode (LED) panel shown in FIG. 1.
Figure 3:
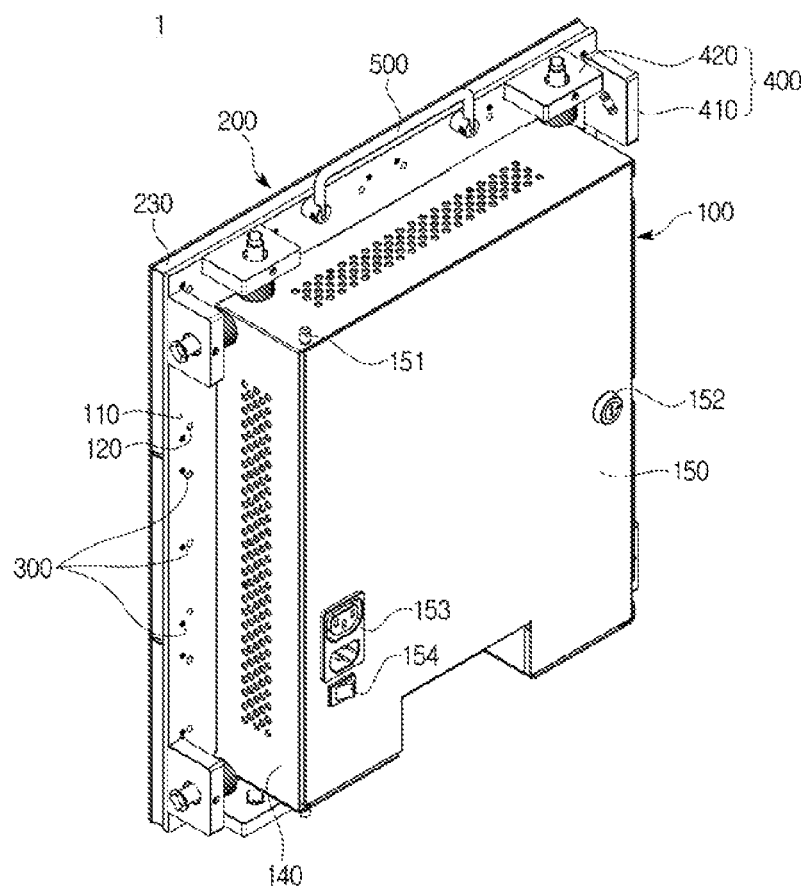
FIG. 3 is a view of the appearance of the display module of FIG. 1, which is viewed from the other side.

FIG. 1 is a perspective view of a display module 1 according to an exemplary embodiment, which is viewed from one side, and FIG. 2 is an enlarged view of part A of a Light Emitting Diode (LED) panel shown in FIG. 1. FIG. 3 is a perspective view of the appearance of the display module 1 of FIG. 1, which is viewed from the other side.

Referring to FIGS. 1 to 3, a display module 1 may include a cabinet 100, and a plurality of Light Emitting Diode (LED) panels 200 arranged on the cabinet 100.

The cabinet 100 may include a connection unit 400 to couple the display module 1 to another display module (see FIG. 12), and a handle 500 to conveniently carry the display module 1. The handle 500 may be rotated to not protrude out of the display module 1 when coupling the display module 1 to another display module.

The LED panel 200 may include an LED substrate 220 on which a plurality of LEDs 210 are arrayed, and a supporting member 230 on which the LED substrate 220 is mounted.

Once the plurality of LED panels 200 are built/attached on the cabinet 100, borders or seams may be formed between the LED panels 200 arranged adjacent to one another. As the plurality of LEDs 210 arrayed on the LED substrate 220 become smaller in size to form a high-quality image, level differences amongst the plurality of LEDs 210 become smaller accordingly. In this case, if level differences amongst the plurality of LED panels 200 are larger than level differences amongst the plurality of LEDs 210 or if there are level differences amongst the plurality of LED panels, seams between the plurality of LED panels 200 are clearly seen.

In accordance with an exemplary embodiment, the display module 1 may include a plurality of level regulators 300 configured to regulate level differences amongst the plurality of LED panels 200 to implement a seamless display.

Components of the display module 1 will be described in detail with reference to FIGS. 4 to 10.

Figure 4:
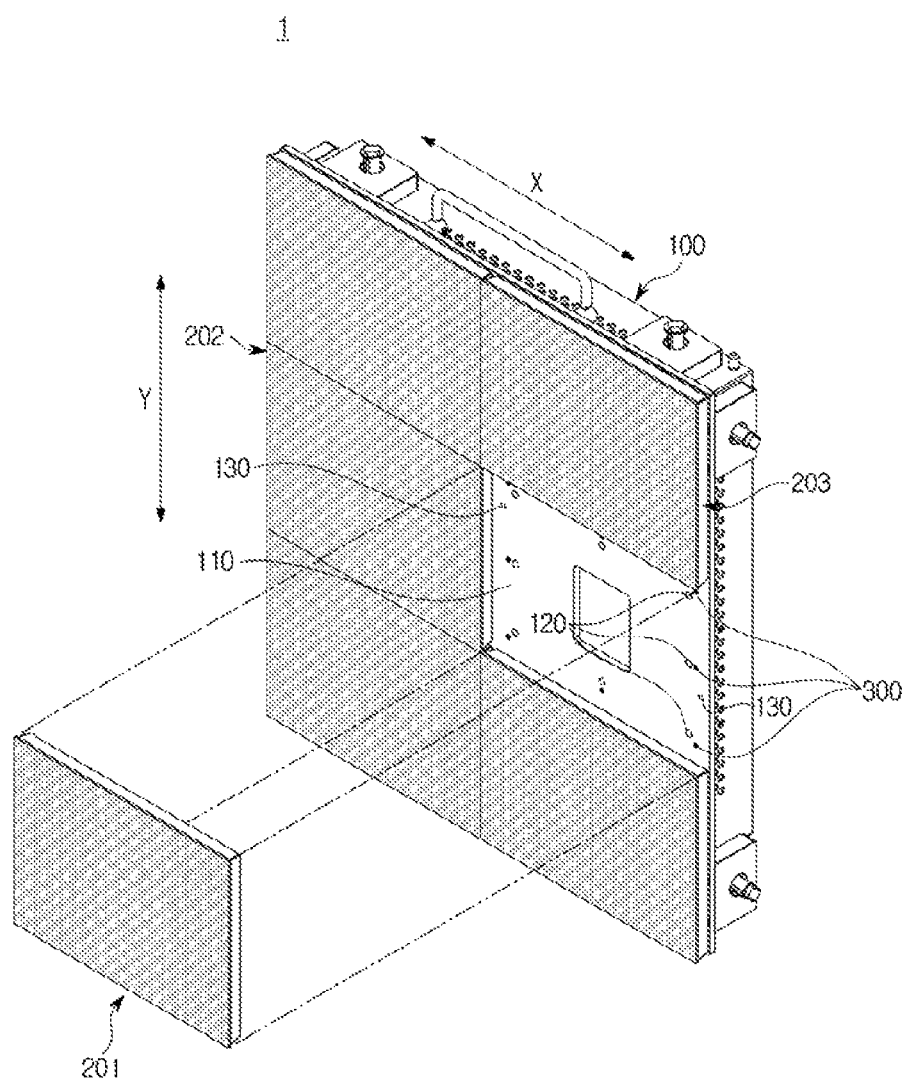
FIG. 4 is a perspective view of the display panel of FIG. 1, where an LED panel is broken down from the display module.
Figure 5:
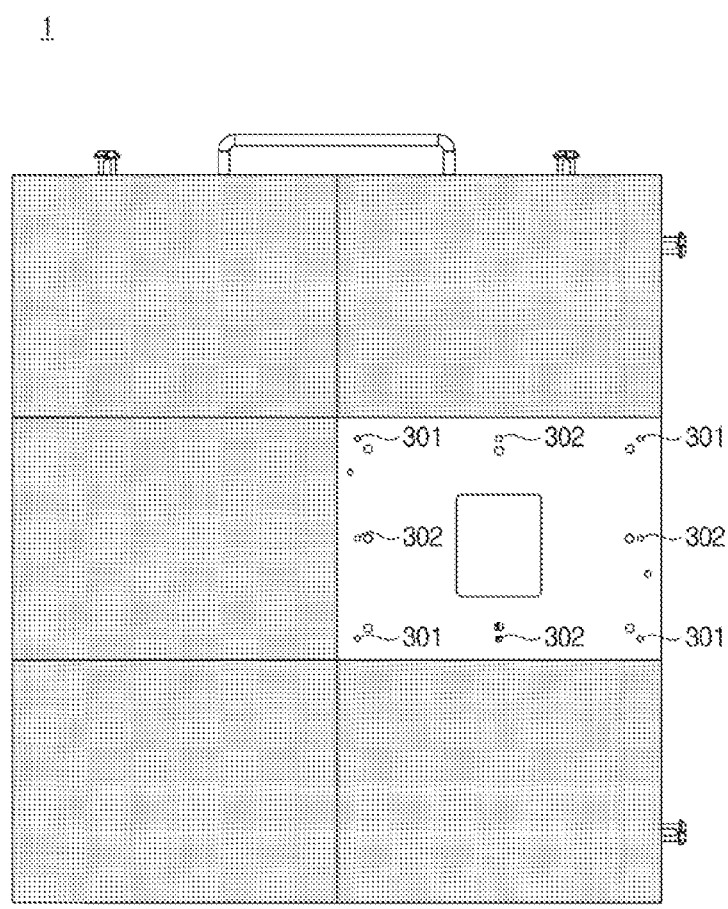
FIG. 5 is a front view of the display panel of FIG. 4, where an LED panel is eliminated.
Figure 6:
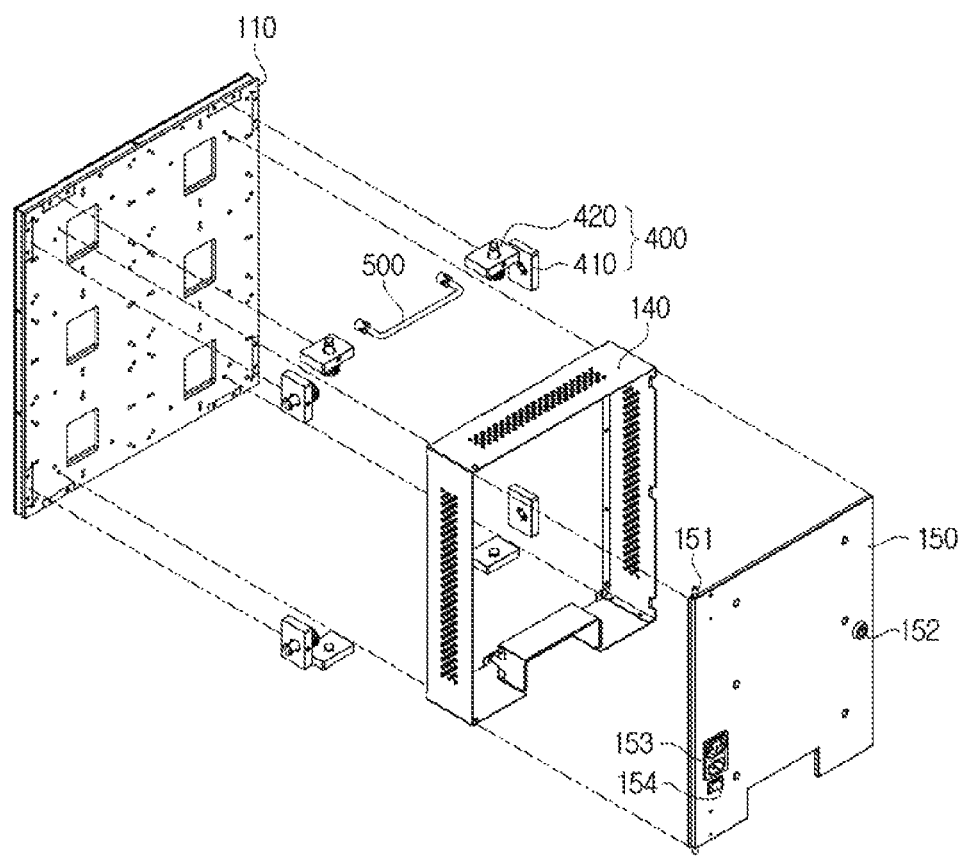
FIG. 6 is an exploded view of a cabinet of the display module of FIG. 1.
Figure 7:
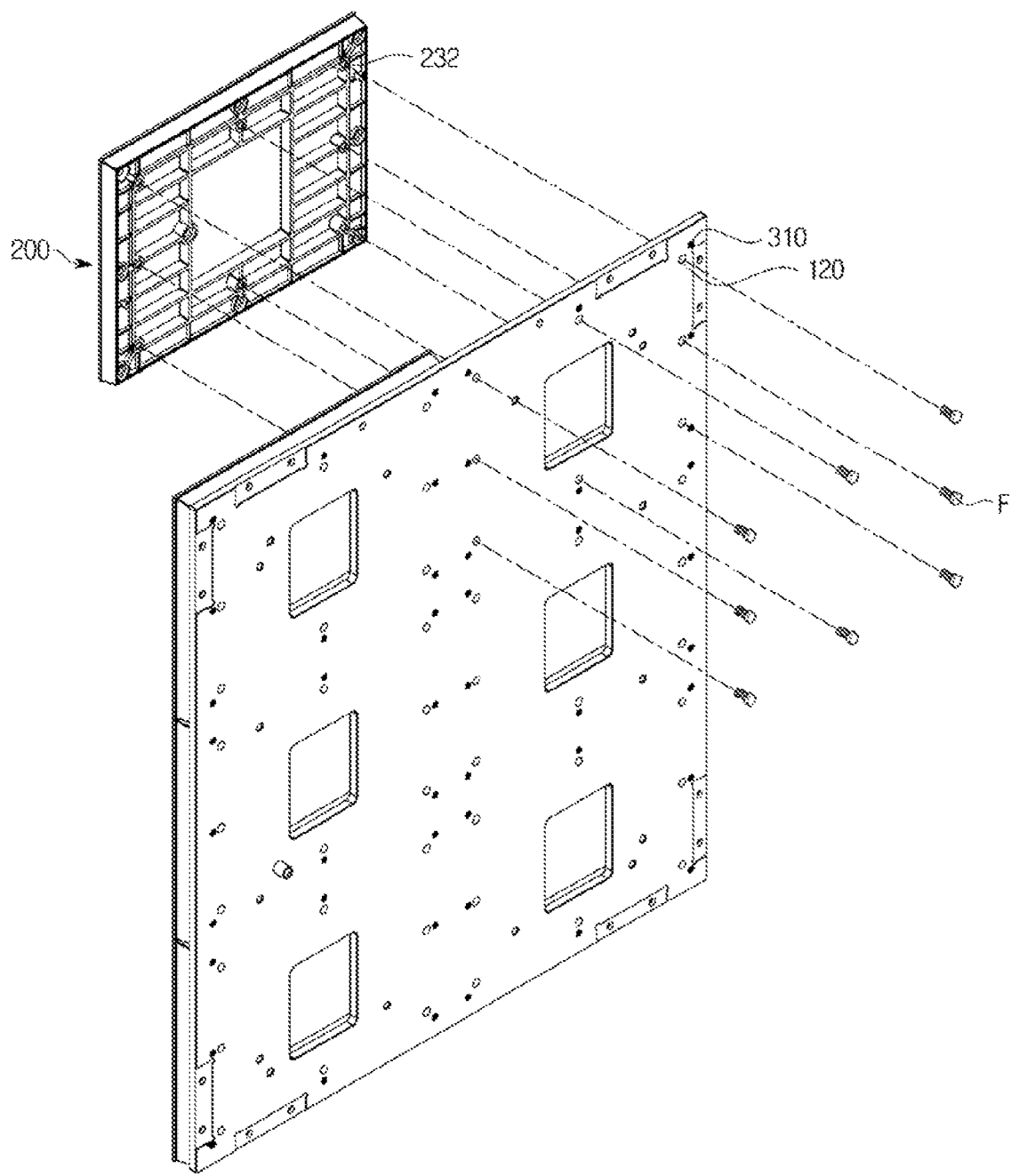
FIG. 7 is a view showing combination of a base plate and an LED panel of the cabinet.
Figure 8:
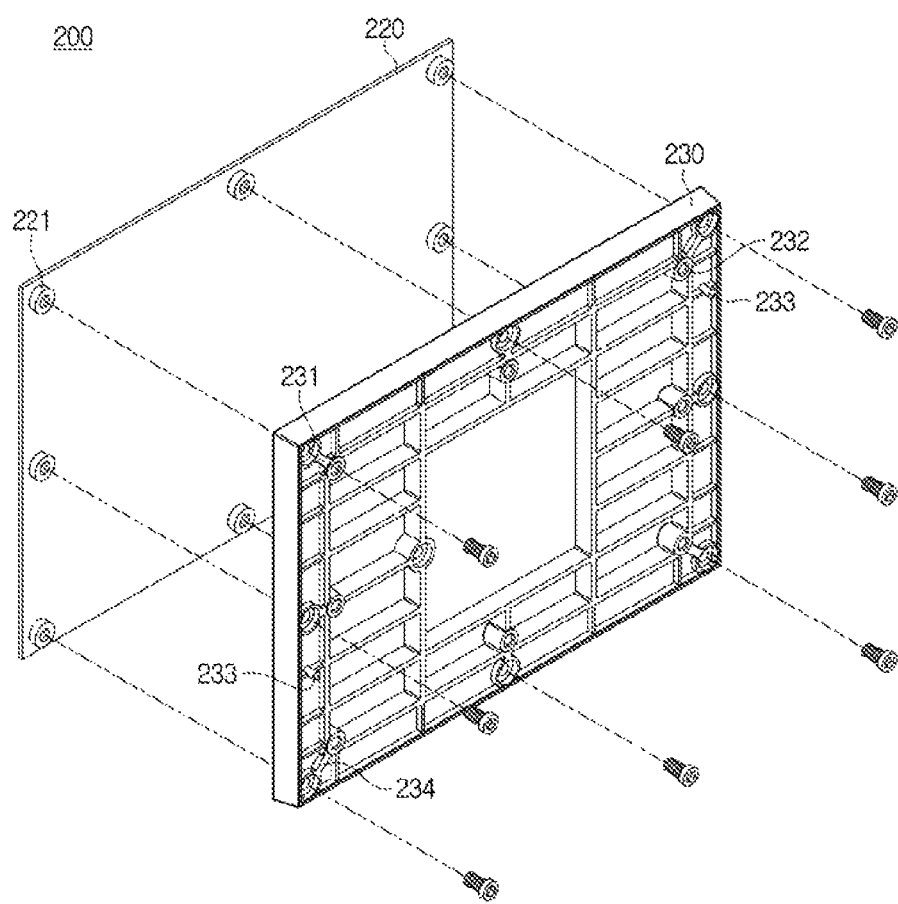
FIG. 8 is an exploded view of an LED panel.
Figure 9:
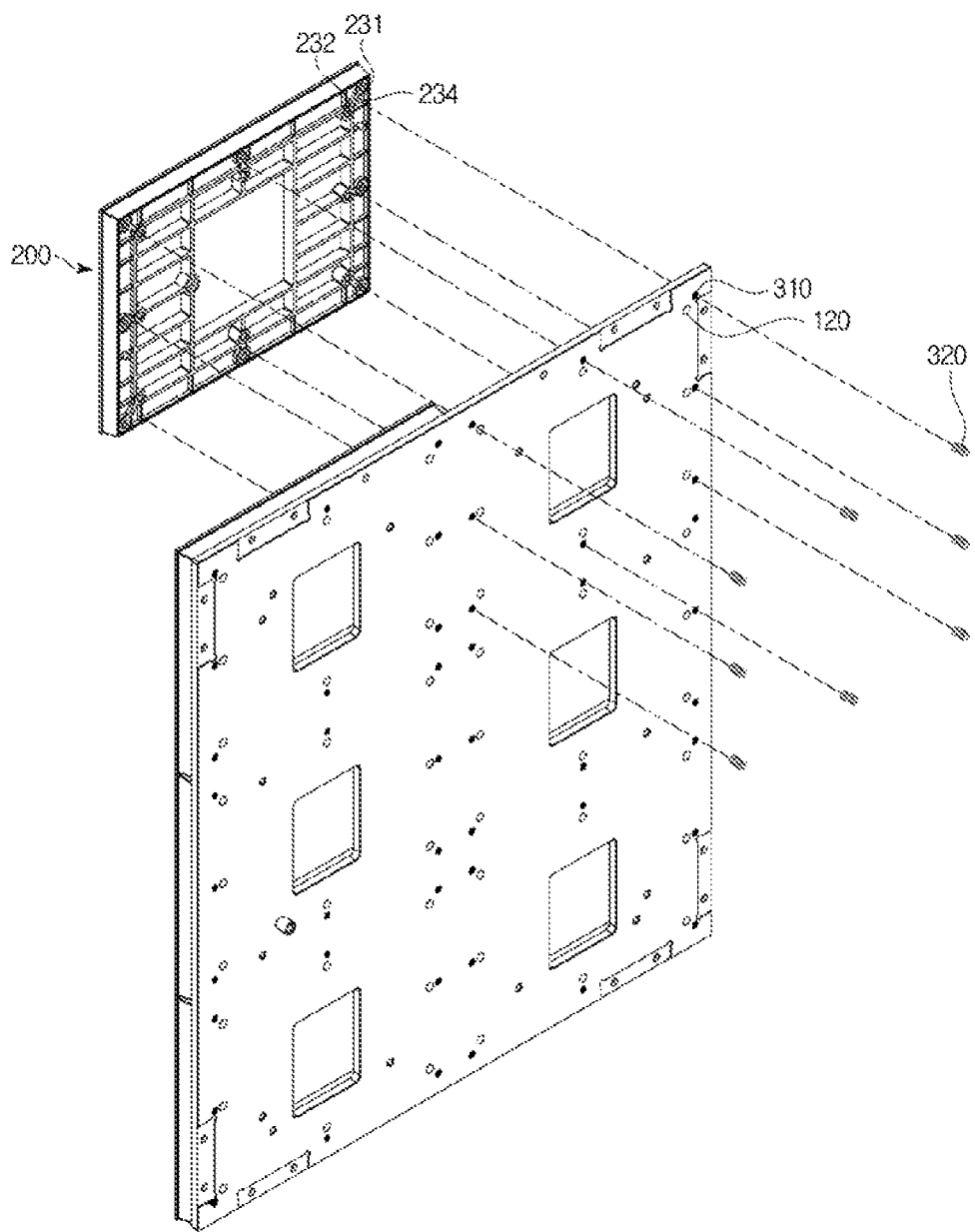
FIG. 9 is a view showing level regulation between a base plate and an LED panel of the cabinet.
Figure 10:
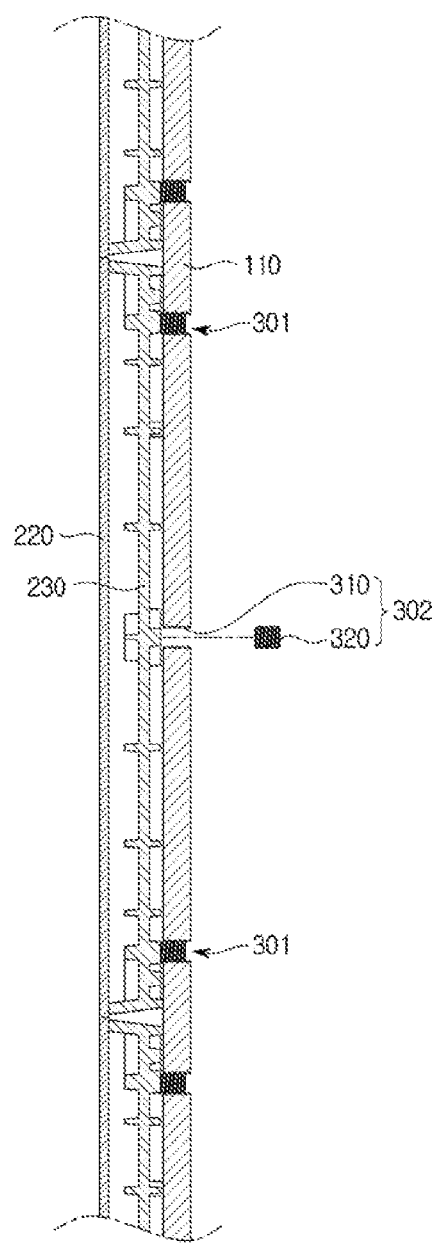
FIG. 10 is a cross-sectional view of a base plate and LED panel based on the center of level regulators.

FIG. 4 is a perspective view of the display panel 1 of FIG. 1, where an LED panel 201 is shown to be detached from the display module 1, and FIG. 5 is a front view of the display module 1 with the LED panel 201 of FIG. 4 removed therefrom. FIG. 6 is an exploded view of the cabinet 100 of the display module 1 of FIG. 1, and FIG. 7 is a view showing combination of a base plate 110 and an LED panel 200 of the cabinet 100. FIG. 8 is an exploded view of an LED panel 200, FIG. 9 is a view showing level regulation between a base plate 110 and an LED 200 panel of the cabinet 100, and FIG. 10 is a cross-sectional view of a base plate 110 and LED panel 200 based on the center of level regulators.

Referring to FIG. 4, the plurality of LED panels 200 included in the display module 1 may include a first LED panel 201, and a second LED panel 202 arranged in a first direction X with respect to the first LED panel 201. The plurality of LED panels 200 may also include a third LED panel 203 arranged in a second direction Y with respect to the first LED panel 201. As shown in the figure, the first and the second direction are perpendicular to each other.

In the exemplary embodiment of FIG. 4, the display module 1 includes a total of six (6) LED panels 200 in two (2) columns of the first direction X and three (3) rows of the second direction Y. That is, the display module is formed in a 2×3 array of LED panels 200.

A plurality of level regulators 300 are arranged to regulate level differences between edges of the first and second LED panels 201 and 202 arranged adjacent to each other in the first direction X, and to regulate level differences between edges of the first and third LED panels 201 and 203 arranged adjacent to each other in the second direction Y.

Referring to FIG. 5, the plurality of level regulators 300 may include first level regulators 301 located at respective corners of the first LED panel 201 of a quadrilateral shape, in order to regulate level differences between the first, second and third LED panels 201, 202, and 203. The exemplary embodiment shows that the LED panels 201, 202 and 203 are in a quadrilateral shape. However, the shapes of the LED panels 201, 202 and 203 are not particularly limited.

The plurality of level regulators 300 may also include second level regulators 302 to regulate level differences between the first and second LED panels 201 and 202 or between the first and third LED panels 201 and 203.

Referring to FIG. 6, the cabinet 100 of the display module 1 may include a base plate 110 on which the LED panels 200 are mounted, side walls 140, and a door 150. On the base plate 110, connection units 400 formed to combine another display module, and a handle 500 to easily carry the display module 1 may be arranged.

The side walls 140 may be combined with the base plate 110, and the door 150 may be combined with the side walls 140 through hinges 151. A door lock 152 may be installed on the opposite side of where the side walls 140 are combined with the door 150 through the hinges 151.

Referring to FIG. 7, in the cabinet 100 of the display module 1, there are a plurality of fastening parts 120 to fasten the plurality of LED panels 200 to the cabinet 100, in which case the plurality of level regulators 300 are arranged to be located adjacent to the respective fastening parts 120. In the exemplary embodiment, the plurality of fastening parts correspond to a plurality of fastening holes 120 and the plurality of fastening holes 120 are provided inward of the plurality of regulators 300 toward a center portion of the respective LED panel 200.

The level regulators 300 may be configured to regulate level differences formed in a direction substantially perpendicular to the direction in which the plurality of LED panels 200 are arrayed. That is, the level regulators 300 may be configured to regulate level differences formed in a thickness direction of the cabinet 100 of the display module 1.

On the LED panel 200, a plurality of combining parts 232 to be combined with the plurality of fastening parts 120 arranged in the cabinet 100 may be formed, and the level regulators 300 may be arranged to press the LED panel 200 between the respective combining parts 232 and edges of the LED panel 200. In the exemplary embodiment, the plurality of combining parts 232 correspond to a plurality of combining holes 232 such that a plurality of fasteners F are inserted through the plurality of fastening holes 120 and the plurality of combining holes 232. However, the exemplary embodiment is not particularly limited on how the LED panel 200 is attached to the base plate 110 via the plurality of fastening parts 120 and the plurality of combining parts 232.

With the level regulators 300 pressurizing between the combining parts 232 of the LED panel 200 and the edges of the LED panel 200, level differences near the borders with the neighboring LED panels 200 may be finely regulated.

Referring to FIGS. 8 to 10 to examine a preferred position of the LED panel 200 pressed by the level regulator 300, the LED panel 200 may include an LED substrate 220 on which a plurality of LEDs 210 are arrayed, and a supporting member 230 to support the LED substrate 220. The supporting member 230 may include a plurality of fastening parts 231 to fasten the LED substrate 220 to the supporting member 230, and the LED substrate 220 may include a plurality of combining parts 221 to be combined with the plurality of fastening parts 231 of the supporting member 230.

The level regulators 300 may press the LED panel 200 between the combining part 232 of the supporting member 230 combined with the fastening part 120 of the cabinet 100 and the fastening part 231 of the supporting member 230 that fastens the combining part 221 of the LED substrate 220.

Pressing the inner side of the location of the fastening part 231 of the supporting member 230 that fastens the LED substrate 220 may prevent the level difference between the LED substrate 220 and the supporting member 230 from getting loose or prevent the LED panel 200 from being modified due to pressure.

Inside the cabinet 100, a signal control board to control the plurality of LED panels 200 and a power supply device to supply power to the LED panels 200 may be arranged.

There may be rooms formed at the side walls 140 and the door 150 for various terminals connected to the signal control board to be exposed. Furthermore, at the door 150 or at the side walls 140, a power terminal 153 to be powered in and out, and a switch 154 to turn on/off the power may be arranged.

A hinged rear cover of the cabinet 100 serving as the door 150 may provide convenience for maintenance and repair of the display module 1, and the power terminal 153 having both inlet and outlet formed therein may facilitate supply of power to respective display modules 1 in the manner of cascade when the display module 1 is in combination with another display module.

Referring to FIGS. 9 and 10, the level regulators 300 may include level regulating holes 310 formed on the base plate 110 of the cabinet 100, and level regulating bolts 320 to be inserted into the level regulating holes 310. The level regulating bolts 320 may be moved through rotation in a direction (i.e., in a thickness direction of the base plate 110) perpendicular to the directions in which the LED panels 200 are arranged, and the movement of the level regulating bolts 320 may press the supporting member 230 of the LED panel 200. Especially, the level regulation bolts 320 may be non-head bolts having an end into which a hexagonal wrench is inserted.

Guide members 233 may be included in the supporting member 230 of the LED panel 200 to guide the LED panel 200 to be mounted on the base plate 110 of the cabinet 100 in the right direction.

Guide grooves 130 may be formed on the base plate 110 for the guide members 233 to be inserted thereto only when the LED panel 200 is mounted on the base plate 110 in the right direction.

Figure 11:
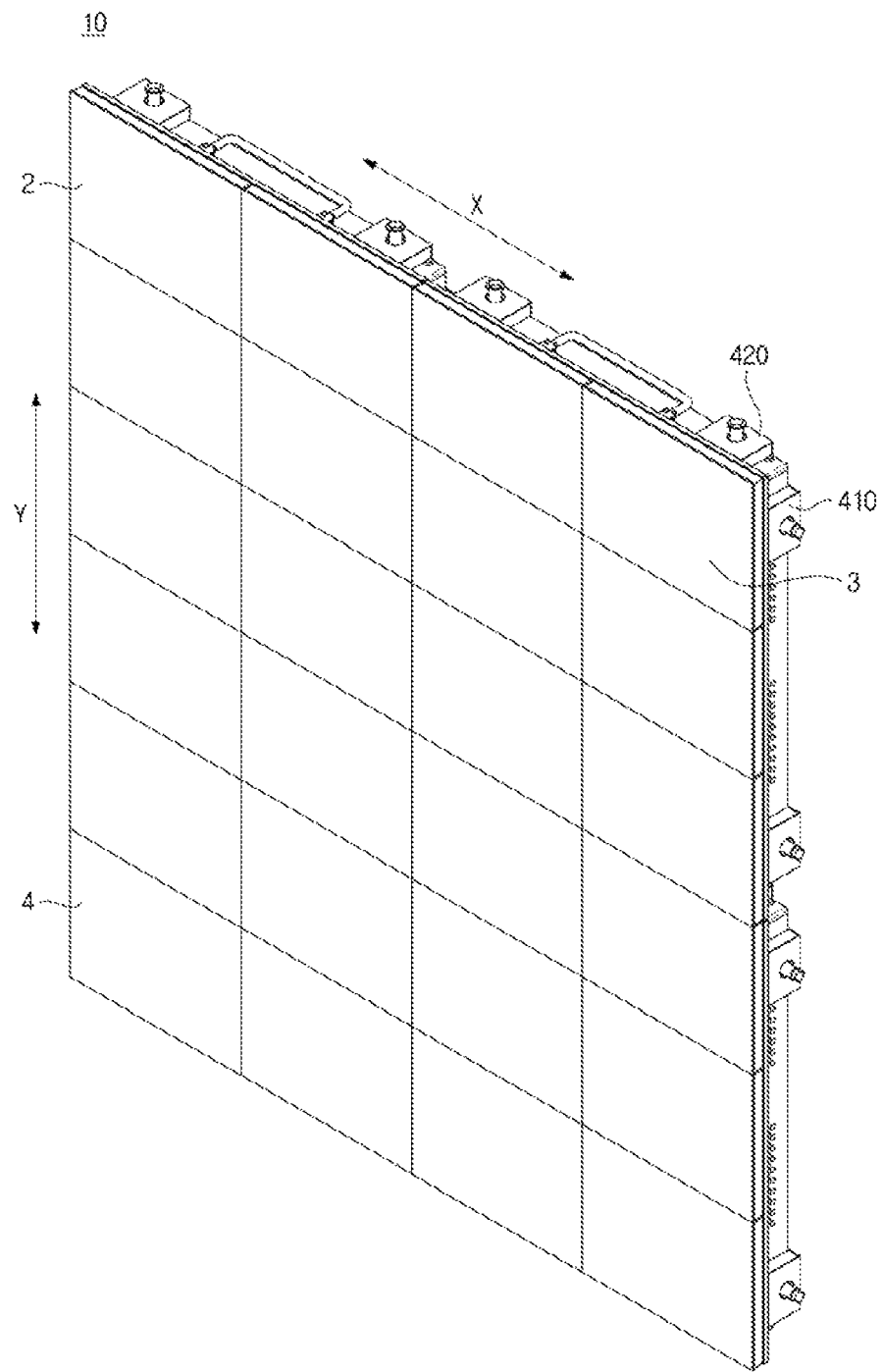
FIG. 11 is a view of the appearance of a display device, according to an exemplary embodiment, which is viewed from one side.
Figure 12:
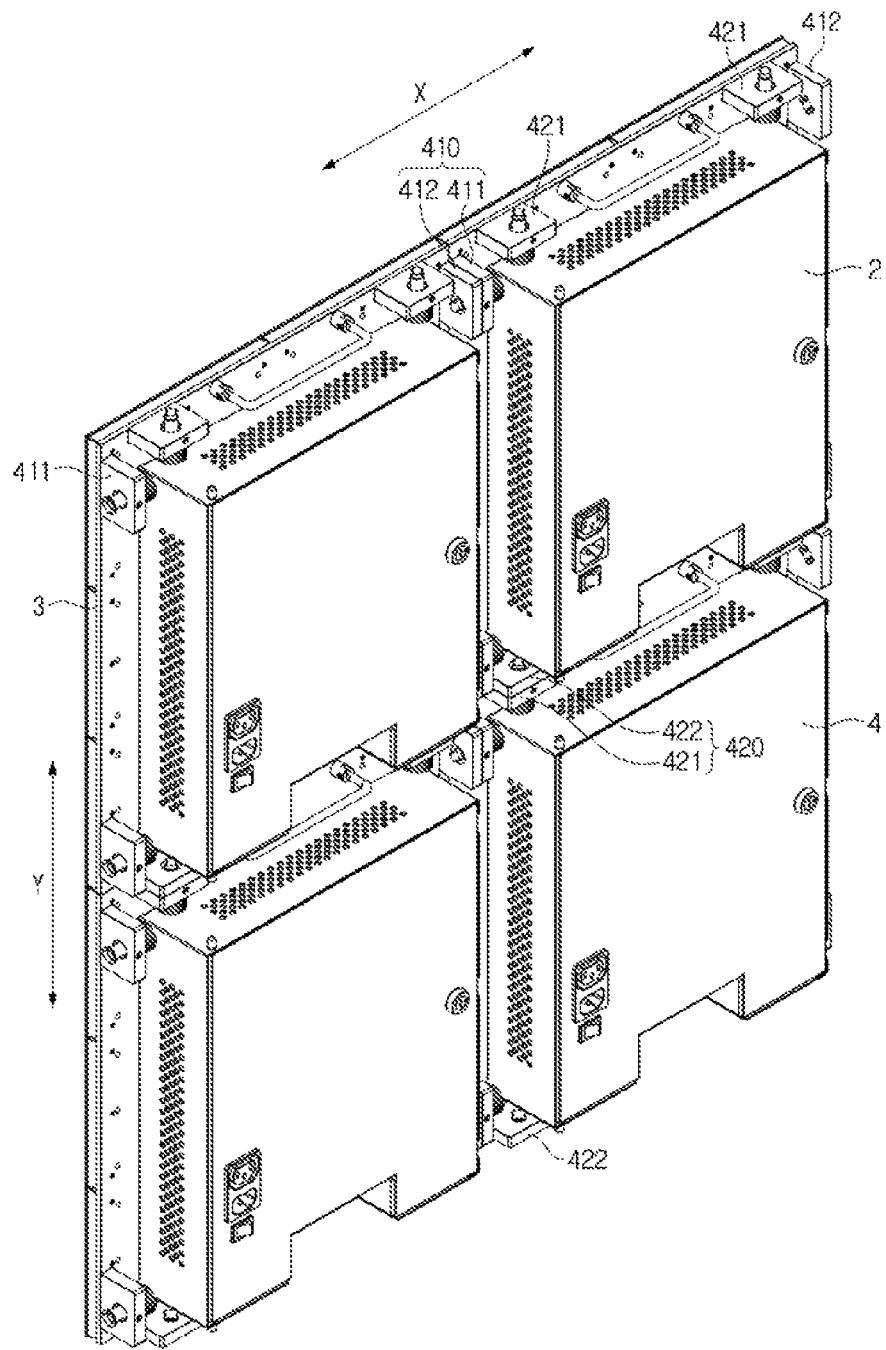
FIG. 12 is a view of the appearance of the display device of FIG. 11, which is viewed from the other side.

FIG. 11 is a perspective view of the appearance of a display device 10, according to an exemplary embodiment, which is viewed from one side, and FIG. 12 is a perspective view of the appearance of the display device of FIG. 11, which is viewed from the other side.

Referring to FIGS. 11 and 12, a display device 10 may include a plurality of display modules 1. The plurality of display modules 1 may be arranged in the first direction X, second direction Y, or first and second directions X and Y to fit a desired size of the display device 10.

Specifically, the plurality of display modules 1 may include a first display module 2, and at least one second display module 3 arranged in the first direction X with respect to the first display module 2. The plurality of display modules 1 may also include at least one third display module 4 arranged in the second direction Y with respect to the first display module 2.

The plurality of display modules 1 included in the display device 10 may employ the display module in accordance with the exemplary embodiment. Accordingly, the following description will focus on combination of the display modules 1.

The cabinet 100 of each of the display modules 1 may include at least one connection unit 400 formed to be combined with another display module.

Specifically, the first display module 2 and the second display module 3 may be connected in the first direction X via first connection units 410 formed on the cabinets 100 of the first and second display modules 2 and 3, respectively.

Furthermore, the first display module 2 and the third display module 4 may be connected in the second direction X via second connection units 420 formed on the cabinets 100 of the first and third display modules 2 and 4, respectively.

The first connection unit 410 may include at least one first link 411 formed on one side of the first display module 2 and the second display module 3, and at least one second link 412 formed on the other side of them, and the second connection unit 420 may include at least one third link 421 formed on one side of the first display module 2 and the third display module 4, and at least one fourth link 422 formed on the other side of them.

Figure 13:
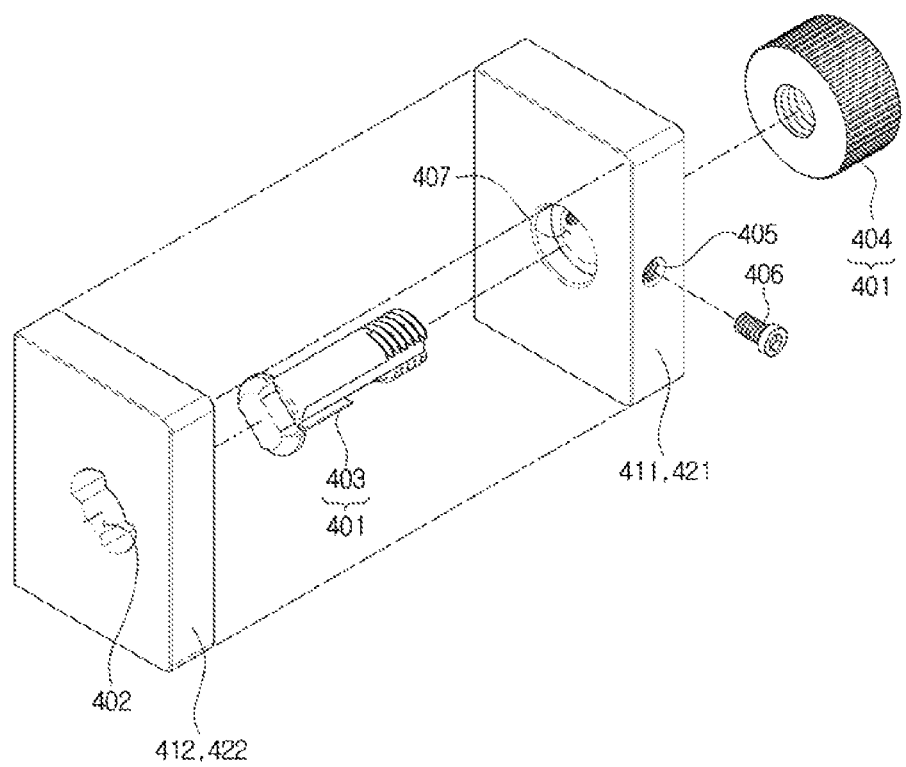
FIG. 13 is an exploded view of a connection unit.
Figure 14:
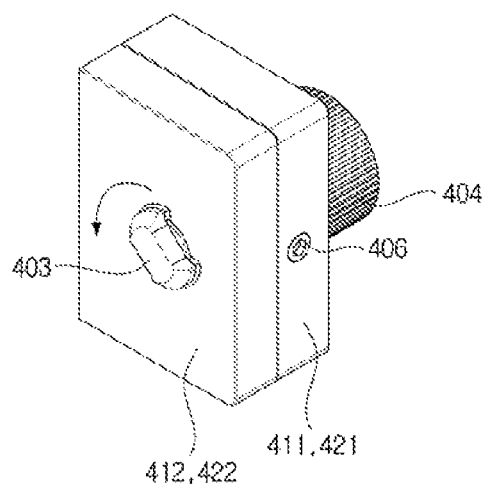
FIG. 14 is a perspective view showing a state of a combined connection unit.

FIG. 13 is an exploded view of a connection unit, and FIG. 14 is a perspective view showing a state of a combined connection unit.

Taking FIGS. 13 and 14 as an example of the first connection unit 410, the first link 411 may include a fastening member 401, and the second link 412 may include a insertion hole 402 into which the fastening member 401 may be inserted.

The fastening member 401 may include a first fastening part 403 in the form of a bolt, a second fastening part 404 for regulating the length of the first fastening part 403 by rotation, and a fixing unit 406 inserted into a fixing hole 405 of the first link 411 to set limits of rotation of the first fastening part 403 while preventing the first fastening part 403 from falling out of the first link 411.

The third and fourth links 421 and 422 of the second connection unit 420 have the same structures as those of the first and second links 411 and 412 of the first connection unit 410.

In the case of combining the plurality of display modules via the first and second links 411 and 412 of the first connection unit 410 or the third and fourth links 421 and 422 of the second connection unit 420, the user may easily combine the display modules only by turning the second fastening part 404 of the fastening member 401 formed on the first link 411 or the third link 421.

Once the plurality of display modules 1 are combined by the connection units 400, borders or seams may be formed between the display modules 1 arranged adjacent to each other. Similar to the relationships between the LED panels 200, in a case of high-quality display with small-sized LEDs 210, if level differences are formed between the display modules 1, the seams are seen more clearly.

The level differences between the display modules 1 may be regulated by the level regulators 300 of the LED panel 200 included in each display module 1. Specifically, the level differences between the display modules 1 may be regulated by the plurality of level regulators 300 arranged along the edges of the display modules 1.

Figure 15:
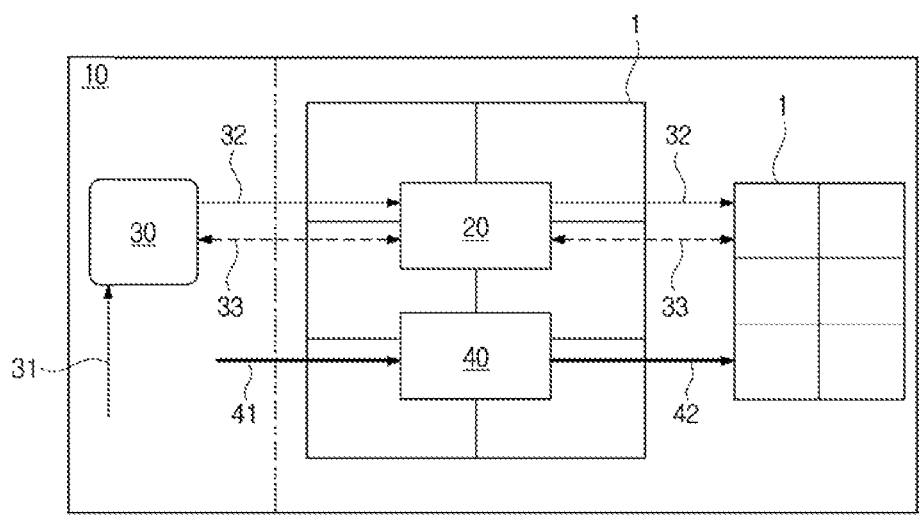
FIG. 15 is a schematic block diagram of an image signal control system and power control system of a display device.

FIG. 15 is a schematic block diagram of an image signal control system and power control system of a display device.

The plurality of display modules 1 included in the display device 10 may each include a signal control board 20, and the display device 10 may include a main board 30 to transmit image signals 32 to the signal control board 20. The main board 30 and the signal control board 20 located in each of the plurality of display modules 1 exchange control signals 33 to control e.g., the position of the display module 1.

Specifically, the main board 30 converts an external image signals 31 received from any of various image devices, such as Personal Computers (PCs), Digital Versatile Disks (DVDs), etc., to an image signal 32 to be formed on the display device 10 as images, and transmits the image signal 32 to the signal control board 20 of the display module 1.

The image signal 32 transmitted from the main board 30 may be sequentially delivered to the plurality of signal control boards 20 in the manner of cascade.

The signal control board 20 extracts a signal from the received image signal 32 that matches the position of each display module 1 to form an image, and the signal control board 20 may form an image by distributing signals that match the respective positions of the LED modules 200 to the plurality of LED modules 200.

The display modules 1 may each include a power supply device 40. Since it is not easy to distribute external power 41 to the respective display modules 1, the power 42 may be delivered to the next display module in the manner of cascade by being relayed at the power terminal 153 formed on each cabinet 100.

Such an image signal control system and power control system may help with combination of the plurality of display modules 1 to form a large-sized display device 10.

According to exemplary embodiments of the present disclosure, the display module may regulate level differences between a plurality of LED panels equipped in a cabinet using level regulators included in the cabinet.

Moreover, the display module may be easy to carry and may be easily connected to another display module using at least one connection unit included in the cabinet.

Furthermore, the display device may regulate level differences between the plurality of display modules using level regulators of the display modules included in the display device.

Although exemplary embodiments have been particularly shown and described above, a person of ordinary skill in the art will understand and appreciate that various modifications can be made without departing the scope of the inventive concept as defined by the following claims.

What is claimed:

1. A display module comprising:
   a cabinet; and
   a plurality of Light Emitting Diode (LED) panels arranged on the cabinet in an array, each LED panel of the plurality of LED panels having a plurality of LEDs,
   wherein the cabinet comprises a plurality of surface level regulators configured to regulate surface level differences of the plurality of LED panels, the surface level differences being measured in a direction perpendicular to a display surface of the display module, and
   wherein the plurality of surface level regulators comprise first surface level regulators provided at respective corners of the plurality of LED panels.

2. The display module of claim 1, wherein the plurality of surface level regulators further comprise second surface level regulators arranged between the first surface level regulators.

3. The display module of claim 2, wherein the second surface level regulators are arranged along respective edges of the plurality of LED panels.

4. The display module of claim 2,
   wherein the cabinet comprises a first plurality of fastening parts to fasten the plurality of LED panels to the cabinet,
   wherein the first plurality of fastening parts comprise first fastening parts configured to fasten the respective corners of the plurality of LED panels to the cabinet, and
   wherein the first surface level regulators are provided at the respective corners of the plurality of LED panels and adjacent to the respective first fastening parts.

5. The display module of claim 4,
   wherein the first plurality of fastening parts further comprise second fastening parts arranged between the first fastening parts, and
   wherein the second surface level regulators are provided adjacent to the respective second fastening parts.

6. The display module of claim 5, wherein the second fastening parts are arranged along respective edges of the plurality of LED panels.

7. The display module of claim 1,
   wherein each of the plurality of LED panels comprises a first plurality of combining parts configured to attach the plurality of LED panels to the cabinet, and
   wherein the plurality of surface level regulators are configured to press the LED panels at locations between the first plurality of combining parts and edges of the LED panels.

8. The display module of claim 1,
   wherein each of the plurality of LED panels comprises:
      an LED substrate on which a plurality of LEDs are provided; and
      a supporting member supporting the LED substrate,
   wherein the LED substrate comprises a second plurality of combining parts configured to fasten the LED substrate to the supporting member,
   wherein the supporting member comprises:
      a second plurality of fastening parts to fasten the LED substrate to the supporting member; and
      a third plurality of combining parts configured to fasten the supporting member to the cabinet, and
   wherein the plurality of surface level regulators are configured to press the LED panels at locations between the third plurality of combining parts and the second plurality of fastening parts of the supporting member.

9. The display module of claim 1,
wherein the plurality of surface level regulators are configured to regulate inclination level in a thickness direction of the display module.

10. The display module of claim 1,
wherein the cabinet comprises a base plate on which the LED panels are mounted,
wherein the plurality of surface level regulators comprise:
level regulation holes provided in the base plate; and
level regulation bolts inserted into the level regulation holes, and
wherein the level regulation bolts are configured to move via rotation through the level regulation hole to press the LED panels.

11. The display module of claim 10,
wherein the level regulation bolts comprise non-head bolts.

12. The display module of claim 1,
wherein each of the plurality of LED panels comprises a guide member configured to guide a mounting direction of the LED panel onto the cabinet.

13. The display module of claim 12,
wherein the cabinet comprises guide grooves into which the guide members are inserted.

14. The display module of claim 1,
wherein the cabinet comprises:
a signal control board configured to control the plurality of LED panels; and
a power supply device configured to supply power to the plurality of LED panels.

15. The display module of claim 1,
wherein the cabinet comprises a handle.

16. The display module of claim 1,
wherein the cabinet comprises at least one connection unit configured to connect another display module to the display module.

17. A display module comprising:
a cabinet having a base plate;
a plurality of Light Emitting Diode (LED) panels provided on the base plate in first and second directions; and
a plurality of surface level regulators provided on the base plate and configured to regulate surface level differences formed on borders amongst the plurality of LED panels, the surface level differences being measured in a direction perpendicular to a display surface of the display module,
wherein the plurality of LED panels comprise a first LED panel, a second LED panel arranged in the first direction adjacent to the first LED panel, and a third LED panel arranged in the second direction adjacent to the first LED panel, and
wherein the plurality of surface level regulators comprise a plurality of first surface level regulators and a plurality of second surface level regulators, the plurality of first surface level regulators are configured to regulate level difference formed on the borders amongst the first, the second and the third LED panels, and the plurality of second surface level regulators are configured to regulate level differences formed on the borders between the first and the second LED panels or between the first and the third LED panels.

18. A display device comprising a plurality of display modules,
wherein each of the plurality of display module comprises:
a plurality of Light Emitting Diode (LED) panels, each of the plurality of LED panels comprising a plurality of LEDs;
a cabinet on which the plurality of LED panels are mounted; and
surface level regulators configured to regulate surface level differences amongst the plurality of LED panels, the surface level differences being measured in a direction perpendicular to a display surface of the display module, and
wherein the plurality of display modules comprise:
a first display module; and
at least one second display module arranged in a first direction with respect to the first display module, and
wherein each of the first and the second display modules comprises a first connection unit and the first and second display modules are connected in the first direction by the first connection units of the first and the second display modules.

19. The display device of claim 18,
wherein the plurality of display modules further comprise at least one third display module arranged in a second direction with respect to the first display module, and
wherein each of the first and the third display modules comprises a second connection unit and the first and the third display modules are connected in the second direction by the second connection units of the first and third display modules.

20. The display device of claim 19,
wherein the first connection unit comprises:
at least one first link arranged on a first side of each of the first and the second display modules, and
at least one second link arranged on a second side opposite to the first side of each of the first and the second display modules, and
wherein the at least one first link of the first display module is combined with the at least one second link of the second display module.

21. The display device of claim 20,
wherein the second connection unit comprises:
at least one third link arranged on a first side of each of the first and the third display modules; and
at least one fourth link arranged on a second side opposite to the first side of each of the first and third display modules, and
wherein the at least one third link of the first display module is combined with the at least one fourth link of the third display module.

22. The display device of claim 21,
wherein each of the first and the third links comprises a link fastening member,
wherein each of the second and fourth links comprises an insertion hole into which the fastening member is inserted, and
wherein the plurality of display modules are fastened with one another by the insertion of the fastening members into the insertion holes.

23. The display device of claim 18,
wherein each of the plurality of display modules comprises a signal control board configured to control the plurality of LED panels, and
a main board configured to transmit image signals to the signal control board.

* * * * *